US010212264B2

(12) United States Patent
Robillard

(10) Patent No.: US 10,212,264 B2
(45) Date of Patent: Feb. 19, 2019

(54) MOBILE DEVICE VEHICLE DASHBOARD SHELF

(71) Applicant: Thomas Robillard, Waunakee, WI (US)

(72) Inventor: Thomas Robillard, Waunakee, WI (US)

(73) Assignee: Vehroot, LLC, Waunakee, WI (US)

( * ) Notice: Subject to any disclaimer, the term of this patent is extended or adjusted under 35 U.S.C. 154(b) by 0 days.

(21) Appl. No.: 14/963,486

(22) Filed: Dec. 9, 2015

(65) Prior Publication Data

US 2018/0013871 A1  Jan. 11, 2018

(51) Int. Cl.
| H04M 1/00 | (2006.01) |
| H04M 1/60 | (2006.01) |
| B60K 37/02 | (2006.01) |
| B60R 11/02 | (2006.01) |
| H04M 1/04 | (2006.01) |
| H02J 50/12 | (2016.01) |
| H02J 7/00 | (2006.01) |
| H02J 7/02 | (2016.01) |
| B60R 11/00 | (2006.01) |

(52) U.S. Cl.
CPC .......... *H04M 1/6091* (2013.01); *B60K 37/02* (2013.01); *B60R 11/02* (2013.01); *B60R 11/0241* (2013.01); *B60R 11/0264* (2013.01); *H04M 1/04* (2013.01); *B60K 2350/355* (2013.01); *B60R 2011/0005* (2013.01); *B60R 2011/0075* (2013.01); *H02J 7/0044* (2013.01); *H02J 7/025* (2013.01); *H02J 50/12* (2016.02)

(58) Field of Classification Search
CPC ................. H04M 1/6091; B60K 37/02; B60K 2350/355; B60R 11/0264; H02J 50/12
See application file for complete search history.

(56) References Cited

U.S. PATENT DOCUMENTS

| D590,404 S | 4/2009 | Kim et al. |
| 7,900,988 B2 | 3/2011 | Ryu |
| D688,235 S | 8/2013 | Song |
| D715,284 S | 10/2014 | Iwamoto |
| 8,892,172 B2 | 11/2014 | Grivas et al. |
| 9,150,105 B2 | 10/2015 | Crepaldi et al. |
| 9,251,627 B2 | 2/2016 | Carl |
| D765,648 S | 9/2016 | Starkenburg |
| 9,446,720 B1 | 9/2016 | Prazeres et al. |
| D771,545 S | 11/2016 | Kasparian et al. |

(Continued)

OTHER PUBLICATIONS

"Mobile Home adds a Siri button to any car," internet printout, https://www.engadget.com/2014/08/02/mobile-home-adds-a-siri-button-to-any-car/, printed Aug. 21, 2017, 13 pgs.

(Continued)

*Primary Examiner* — Xin Jia
(74) *Attorney, Agent, or Firm* — Boardman & Clark LLP

(57) ABSTRACT

The present invention comprises a holding device that allows a person to simply set their mobile device on the vehicle dash and instantly obtain power to charge the mobile device, and audio connectivity to hear the mobile device. The holding device defines an angled front surface provided for the mobile device to rest on and be held securely in place. The holding device may get its angled surface from the existing shape of the vehicle dashboard or from an in-dash electronics unit.

20 Claims, 3 Drawing Sheets

(56) References Cited

U.S. PATENT DOCUMENTS

| | | | |
|---|---|---|---|
| 9,521,224 B2 | 12/2016 | An et al. | |
| D810,655 S | 2/2018 | Dabel et al. | |
| 2007/0015537 A1* | 1/2007 | DeBiasio | H04M 1/6091 455/556.1 |
| 2014/0128049 A1* | 5/2014 | Aoki | B60K 37/02 455/418 |
| 2015/0172432 A1* | 6/2015 | An | H04B 1/3883 455/556.1 |
| 2016/0173667 A1* | 6/2016 | Torres Gutierrez | H04M 1/04 455/575.1 |
| 2018/0004250 A1* | 1/2018 | Barnett | H01R 13/6315 |

OTHER PUBLICATIONS

"Mobile Electronics Pro-Series, MobileDock Dash Mount," Mobile Electronic Dash Mounting Hardware, product literature for Model No. IPM-228-BL, 2 pgs.

Sonic Electronix, printout of Sony XSP-N 1BT, Smartphone Cradle Bluetooth Car Stereo Cell Phone in Dash Radio CD, 4 pgs.

Wireless Power Consortium, www.wirelesspowerconsortium.com/blog, Qi Wireless Charging and Cardiovascular Electronic Devices, 8 pgs.

www.amazon.com/TYLT-Wireless-Phone-Charging-Pad/dp/B00DG8NVQI/, TYLT VUQi Wireless Phone Charging Pad: 3 Coil Stand & Fast Battery Charger Station for compqatible iPhone Galaxy Note Lumia Droid DNA LG Google & Android Cell Phones, item on Amazon, printed Feb. 7, 2018, 9 pgs.

www.ebay.com/itm/Bracketron-IPM-228-BL-MobileDocke-Dash-Mount-Brand-New, Bracketron IPM-228-BL MobileDock Dash Mount (Brand New), item on eBay, printed Feb. 7, 2018, 6 pgs.

www.sony.com/en-sa/electronics/in-car-receivers-players/xsp-n1bt, In-Car Bluetooth Audio Receiver & Smartphone Cradle, XSP-N1BT, Sony SA, printed May 31, 2017, 14 pgs.

www.tylt.com/vu-wireless-charger, TYLT Vu Wireless Charger, Qi Charging Station & Iphone 8, 8 Plus & X Pad, printed Feb. 8, 2018, 4 pgs.

Goodwin, Antuan, "What should you look for when choosing a car stereo?", dated Jan. 24, 2014, https://www.cnet.com/roadshow/news/what-should-you-look-for-when-choosing-a-car-stereo.

* cited by examiner

MOBILE DEVICE VEHICLE DASHBOARD SHELF

FIELD OF INVENTION

The invention relates to a holding device for allowing a mobile device (smart phone, tablet, or media player) to rest on and over the vehicle in-dash system and more particularly to a holding device for a mobile device that can be placed on the dashboard of an automobile.

BACKGROUND OF INVENTION

This invention provides improved methods to utilize mobile technology in vehicles. Unlike current designs that integrate mobile technology with vehicle dash displays and controls, this design allows the mobile device to supplant the vehicle display and controls. Other vehicle mobile device solutions include the following US and foreign patents: US 20110153367 issued to Amigo et al., discloses a smartphone holder configured to keep the smartphone in a stable, known position and orientation with respect to the vehicle, such that data from an accelerometer in the smartphone may be calibrated; US 20150117667 issued to Lawande et al., discloses an infotainment system that is configured to be fixed in the vehicle and to acoustically reproduce an audio signal under the control of a control signal; WO 2014059218 issued to Cecchini discloses a vehicle central processing module (CPM) integrated with a mobile device such as a cellular telephone for controlling the electrical systems of a vehicle using a software application executed on a digital processing system of a cellular telephone. WO 2014134452 issued to Holger et al., teaches a mobile electronic device integration with in-vehicle information system. The system displays graphics with an in-vehicle information system and a mobile electronic device. US 20140309880 issued to Ricci, teaches a vehicle crate for blade processors.

While these current patents allow for mobile device use in a vehicle, the invention described herein provides reduced complexity and improved features.

BRIEF SUMMARY OF THE INVENTION

The present invention comprises a holding device that allows a person to simply set their mobile device on the vehicle dash and instantly obtain power to charge the mobile device, and audio connectivity to hear the mobile device. The holding device defines an angled front surface provided for the mobile device to rest on and be held securely in place which in a preferred embodiment may be an angled L-shape. The holding device may get its angled surface from the existing shape of the vehicle dashboard or from an in-dash electronics unit. The angle surface may include traditional stereo and instrumentation components for use in the absence of a mobile device, or simply be left blank. The angle surface may include additional items to secure the mobile device such as tacky gel, brackets, or magnetics. The only requirement for the angle surface is that it offers a level surface for the secure placement of a mobile device. Housed behind the angle surface of the holding device is an NFC antenna and QI charging coils.

It is an object of the present invention to supplant a vehicle system's display and controls with that of the mobile device.

It is yet another object of the present invention that the mobile device when placed on the holding device, the mobile device will act as primary display and control for vehicle technology including audio, navigation, hands-free calling, and diagnostics.

These and other features of the present invention will become readily apparent upon further review of the following specification and drawings.

BRIEF DESCRIPTION OF THE DRAWINGS

To further clarify various aspects of some example embodiments of the present invention, a more particular description of the invention will be rendered by reference to specific embodiments thereof which are illustrated in the appended drawing. It is appreciated that the drawing depicts only illustrated embodiments of the invention and are therefore not to be considered limiting of its scope. The invention will be described and explained with additional specificity and detail through the use of the accompanying drawing in which.

DETAIL DESCRIPTION OF THE INVENTION

Figure 1:
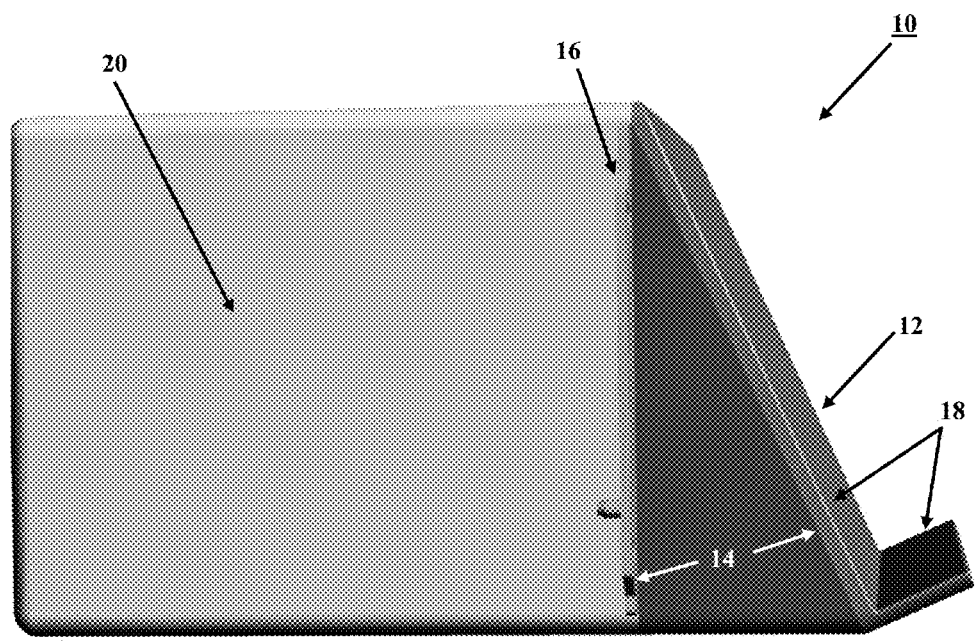
FIG. 1 shows a side view of a holding device in accordance with the present invention.
Figure 2:
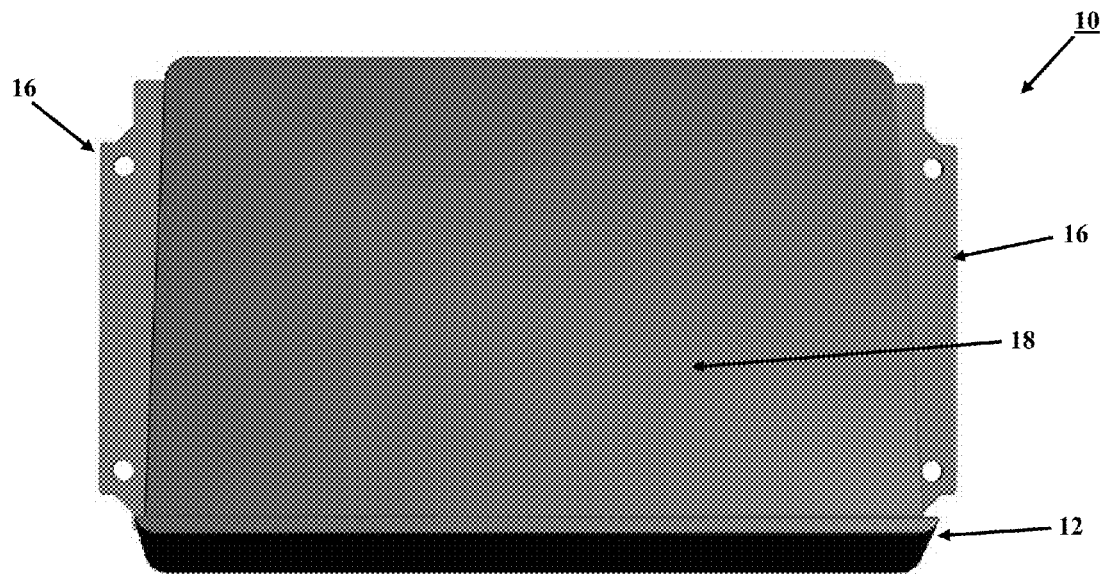
FIG. 2 shows a front view of a holding device in accordance with the present invention.
Figure 3:
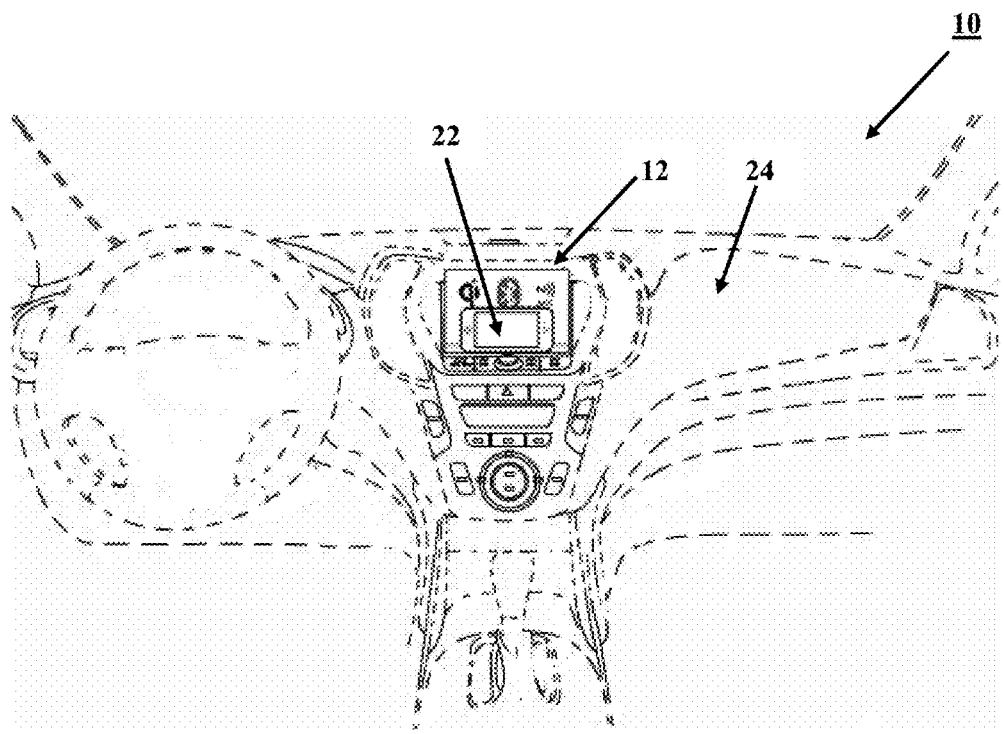
FIGS. 3 and 4 are perspective views view, showing one preferred embodiment of implementing the present invention into a vehicle dashboard.
Figure 4:
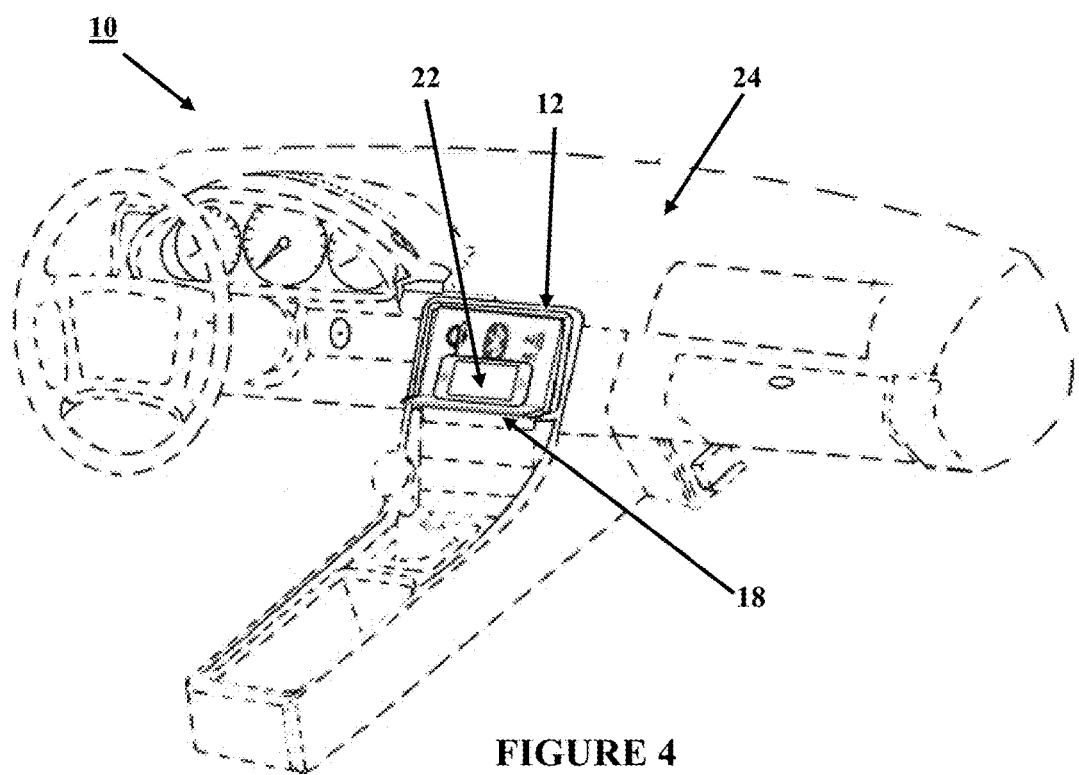

Referring now to FIGS. 1 through 4, there is shown side view of the holding device 10 in accordance with one preferred embodiment of the present invention. The holding device 10 defines a front shelf 12 for holding a mobile device 22. The front shelf is tilted at an angle 14 required for a mobile device 22 to rest against the shelf 12. The angle 14 is shown represented as the area space behind the shelf 12 within a vehicle dashboard 24. In a preferred embodiment, the shelf 12 is an angled L shaped in-dash vehicle surface which acts as a shelf for placement of mobile devices. Shaping a vehicle dashboard surface 24 in the shape of an angled L allows for the placement of any size or model mobile device. Located behind the shelf 12 of holding device 10 is mounting hardware 16 used to connect the shelf 12 with the vehicle dashboard 24. The shelf area 18 is dimensioned such that any size or model mobile device 22 may be set. The holding device 10 further defines a rear housing 20 behind the shelf 12 and mounting hardware 16 within the vehicle dashboard 24 for housing electronic components, as will be more fully described below.

Figure 5:
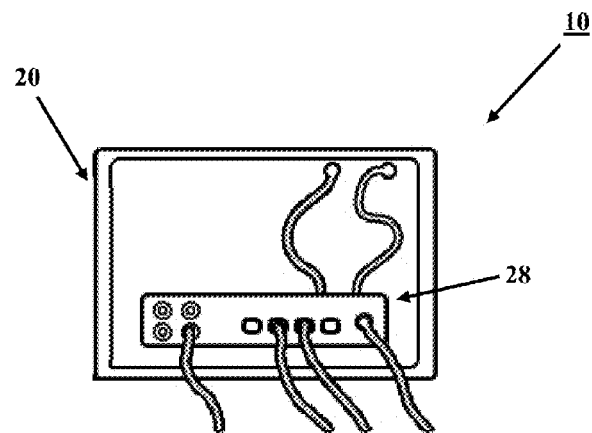
FIG. 5 is a block diagram illustrating the housing of electronic components within the holding device of the present invention the present invention.

Referring now to FIG. 5, the electronic components 28 housed within rear housing 20 may comprise one or more of the following electronic components; NFC antenna and transceiver 40; Bluetooth transceiver 42; audio amplifier 44; vehicle audio system (including existing wiring, speakers, and amplifiers) 46; wireless QI antenna and circuitry 52; 12 VDC vehicle power source 54 and USB Power source (optional) 56 all interconnected electrically as shown in FIG. 6.

Figure 6:
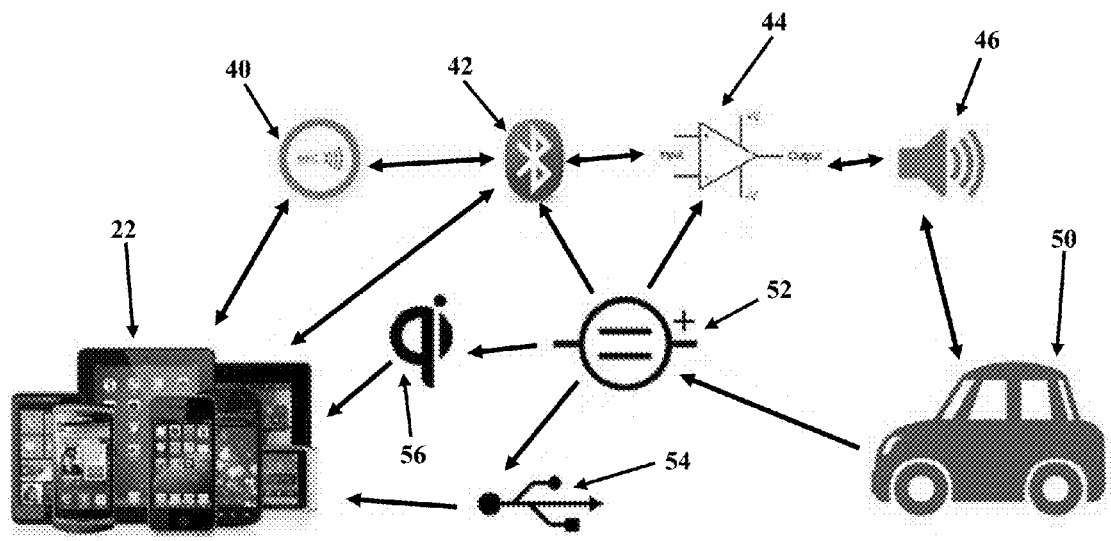
FIG. 6 is a system diagram, illustrating the interconnectivity between the electronic components which may be used by the present invention.

Turning once again to FIGS. 3 and 4 and referring to FIG. 6, when the mobile device 22 is set on the dash unit 24 it will immediately make contact with both the QI coils 52 to begin charging and the NFC antenna 40 to receive audio connectivity settings. If a mobile device 22 is not capable of QI charging, an optional USB power source 56 could be located within the holding device 10 to provide power to the mobile device 22. The NFC connection will send Bluetooth connectivity information to devices 22 for first-time connections. NFC could also detect the presence of a mobile device 22 and disable any existing dashboard 24 unit display and controls behind the mobile device 22.

Turning once again to FIG. 6, if a mobile device 22 is not compatible with NFC technology, manual connections can be made with the Bluetooth transceiver 42. A Bluetooth transceiver 42 will deliver communication between the mobile device 22 and the audio amplifier 44 to provide audio output within the vehicle 50. The audio amplifier 44 will receive audio from the Bluetooth transceiver 42 and deliver these signals to the vehicles 50 existing audio system 46. All of these components can be placed within a standard stereo enclosure of single or double DIN mounting within a vehicle 50, but are not limited solely to the stereo enclosure unit, and could be placed in any area of the vehicle instrument panel capable of providing connectivity with vehicle power and audio.

In summary, the holding device of the present invention allows a person to simply set their mobile device on their vehicle dash and instantly obtain power to charge the mobile device, and audio connectivity to hear the mobile device. An angled surface is provided for the mobile device to rest on and be held securely in place. This surface can get its angle from the shape of the dash or from an in-dash electronics unit. This surface may include traditional stereo and instrumentation components for use in the absence of a mobile device, or simply be left blank. This surface may include additional items to secure the mobile device such as tacky gel, brackets, or magnetics. The only requirement for this surface is that it offers a level surface for the secure placement of a mobile device. Additionally, the angled surface may be made from plastic, metal, wood, stone, or any material that can be assembled or shaped into a shelf and maintain durability within a vehicle It is to be understood that the present invention is not limited to the embodiments described above, but encompasses any and all embodiments within the scope of the following claims.

What is claimed is:

1. A holding device for a mobile device comprising:
   a front shelf for holding a mobile device, the front shelf having an angled L shape comprising a back surface terminating in a lip approximately perpendicularly;
   a rear housing provided behind the front shelf, the rear housing comprising:
      mounting hardware for connecting the rear housing within a vehicle dashboard; and
      electronic components;
   wherein the front shelf is sized to accept a mobile device having a plurality of edges comprising a top edge, bottom edge, first side edge, and second side edge positioned such that a back surface of the mobile device rests upon the back surface of the front shelf and an edge of the plurality of edges of the mobile device rests upon the lip of the front shelf;
   wherein neither the back surface nor the lip are perpendicular or parallel to a top surface of the rear housing; and
   wherein the lip has a depth that is shorter than a height of the back surface.

2. The holding device for a mobile device of claim 1, wherein the shelf back surface further comprises tacky gel.

3. The holding device for a mobile device of claim 1, wherein the shelf back surface further comprises one or more magnets.

4. The holding device for a mobile device of claim 1, wherein the electronic components further comprise one or more QI charging coils.

5. The holding device for a mobile device of claim 1, wherein the electronic components further comprise a Bluetooth transceiver.

6. The holding device for a mobile device of claim 1, wherein the shelf is sized to accept a mobile device of any size or model.

7. A system for providing mobile device use within a vehicle, the system comprising:
   a mobile device;
   a vehicle having a dashboard configured to accept a stereo;
   a holding device provided at least in part within the dashboard, the holding device comprising:
      a front shelf for holding a mobile device, the front shelf having an angled L shape comprising a back surface which intersects with a lip approximately perpendicularly;
      a rear housing provided behind the front shelf, the rear housing comprising:
         mounting hardware for connecting the rear housing within a vehicle dashboard; and
         electronic components;
   wherein a first surface of the mobile device rests on the back surface of the front shelf of the holding device and a second surface of the mobile device rests on the lip of the front shelf; and
   wherein the mobile device connects to the vehicle by the way of the electronic components provided within the holding device;
   wherein neither the back surface nor the lip are perpendicular or parallel to a top surface of the rear housing; and
   wherein the lip has a depth that is shorter than a height of the back surface.

8. The system of claim 7, wherein the front shelf defines a surface, the surface further comprising tacky gel, wherein the tacky gel is used to fasten the mobile device to the holding device.

9. The system of claim 7, wherein the front shelf defines a surface, the surface further comprising one or more magnets, wherein the magnets are used to fasten the mobile device to the holding device.

10. The system of claim 7, wherein the electronic components further comprise one or more QI charging coils.

11. The system of claim 7, wherein the electronic components further comprise a Bluetooth transceiver.

12. The system of claim 7, wherein the mobile device includes any size or model of mobile device.

13. A holding device for a mobile device comprising:
   a front shelf for holding a mobile device, the front shelf having an angled L shape comprising a shelf back surface which intersects with a lip approximately perpendicularly;
   a rear housing provided behind the front shelf, the rear housing comprising mounting hardware for connecting the rear housing within a vehicle dashboard;
   electronic components, the electronic components comprising a Bluetooth transceiver and a wireless charging device;

and wherein neither the back surface nor the lip are perpendicular or parallel to a top surface of the rear housing.

14. The holding device for a mobile device of claim 13, wherein the electronic components further comprise a NFC device.

15. The holding device for a mobile device of claim 13, wherein the wireless charging device comprises one or more QI coils.

16. The holding device for a mobile device of claim 13, wherein the rear housing comprises a standard stereo enclosure unit.

17. The holding device for a mobile device of claim 1, further comprising wherein the holding device does not contact a front surface of the mobile device when a mobile device is provided on the font shelf.

18. The holding device for a mobile device of claim 17, wherein the lip comprises both a top surface and a bottom surface, neither being parallel to the top surface of the rear housing.

19. A system comprising the holding device for a mobile device of claim 1, further comprising a mobile device.

20. A system comprising the holding device for a mobile device of claim 13, further comprising a mobile device, wherein the mobile device has a plurality of edges comprising a top edge, bottom edge, first side edge, and second side edge, wherein a back surface of the mobile device rests upon the back surface of the front shelf and an edge of the plurality of edges of the mobile device rests upon the lip of the front shelf.

* * * * *

UNITED STATES PATENT AND TRADEMARK OFFICE
CERTIFICATE OF CORRECTION

PATENT NO. : 10,212,264 B2
APPLICATION NO. : 14/963486
DATED : February 19, 2019
INVENTOR(S) : Thomas Robillard It is certified that error appears in the above-identified patent and that said Letters Patent is hereby corrected as shown below:

In the Claims

In Column 4, Line 35, in Claim 7, delete "by the" and insert -- by --, therefor.

Signed and Sealed this
Eleventh Day of February, 2020

Andrei Iancu
*Director of the United States Patent and Trademark Office*